(12) United States Patent
Tseng et al.

(10) Patent No.: US 7,441,063 B2  
(45) Date of Patent: Oct. 21, 2008

(54) KVM SYSTEM FOR CONTROLLING COMPUTERS AND METHOD THEREOF

(75) Inventors: Kuo-chou Tseng, Shijr (TW); Cheng-chang Ke, Shijr (TW)

(73) Assignee: Aten International Co., Ltd., Shijr (TW)

( * ) Notice: Subject to any disclaimer, the term of this patent is extended or adjusted under 35 U.S.C. 154(b) by 106 days.

(21) Appl. No.: 11/302,943

(22) Filed: Dec. 14, 2005

(65) Prior Publication Data

US 2007/0136498 A1  Jun. 14, 2007

(51) Int. Cl.
- G06F 13/14 (2006.01)
- G06F 13/00 (2006.01)
- G06F 13/12 (2006.01)
- G06F 13/38 (2006.01)

(52) U.S. Cl. .................. 710/305; 710/100; 710/65; 710/72; 710/316

(58) Field of Classification Search .......... 710/1, 710/72, 73, 100, 305, 65, 316; 709/203; 713/200; 725/151; 345/161, 629; 348/569, 348/584

See application file for complete search history.

(56) References Cited

U.S. PATENT DOCUMENTS

| | | | |
|---|---|---|---|
| 5,721,842 A | 2/1998 | Beasley | |
| 5,884,096 A | 3/1999 | Beasley | |
| 5,937,176 A | 8/1999 | Beasley | |
| 6,112,264 A | 8/2000 | Beasley | |
| 6,304,895 B1 * | 10/2001 | Schneider et al. ........... | 709/203 |
| 6,345,323 B1 | 2/2002 | Beasley | |
| 6,369,858 B1 * | 4/2002 | Lee ............................. | 348/569 |
| 6,598,233 B1 * | 7/2003 | Choi ........................... | 725/151 |
| 6,671,756 B1 * | 12/2003 | Thomas et al. ................ | 710/73 |
| 6,957,287 B2 * | 10/2005 | Lou et al. ...................... | 710/72 |
| 7,206,548 B1 * | 4/2007 | Sumler et al. ............. | 455/67.11 |
| 2001/0026329 A1 * | 10/2001 | Iyama ......................... | 348/584 |
| 2002/0087753 A1 | 7/2002 | Beasley | |
| 2003/0191878 A1 * | 10/2003 | Shirley ........................ | 710/100 |
| 2004/0177264 A1 * | 9/2004 | Anson et al. ................. | 713/200 |
| 2005/0165994 A1 * | 7/2005 | Dickens ....................... | 710/305 |
| 2005/0172039 A1 * | 8/2005 | Hsu .................................. | 710/1 |
| 2006/0262138 A1 * | 11/2006 | Zhang ......................... | 345/629 |
| 2007/0094426 A1 * | 4/2007 | Chiang et al. ................. | 710/73 |
| 2007/0109263 A1 * | 5/2007 | Sim et al. .................... | 345/161 |

* cited by examiner

Primary Examiner—Khanh Dang  
Assistant Examiner—Thomas J Cleary  
(74) Attorney, Agent, or Firm—Chen Yoshimura LLP

(57) ABSTRACT

A system for connecting a console device to computers comprising a graphic user interface menu apparatus for controlling the computers. The system comprises a user-side circuit, a central crosspoint switch, a plurality of computer-side circuits, a menu generating unit and a first switching device. The user-side circuit coupled to the console device receives electronic signals produced by the keyboard and cursor control device and creates a data packet. The central crosspoint switch is coupled to the user-side circuits, receives the data packets and routes the data packets. The computer-side circuits coupled to the central crosspoint switch and the computers receive the data packets from the central crosspoint switch for supplying the data packets to the computers. The menu generating unit generates a menu to be displayed. The first switching device alternately outputs a video signal of the menu data and a video signal from the computers to the video monitor according to a vertical synchronization signal.

20 Claims, 11 Drawing Sheets

KVM SYSTEM FOR CONTROLLING COMPUTERS AND METHOD THEREOF

FIELD OF THE INVENTION

The present invention generally relates to a KVM system for controlling computers and the method used for the same, and more particularly to a system and method capable of controlling computers by processing keyboard-video-mouse (KVM) signals.

BACKGROUND OF THE INVENTION

With rapid development of network engineering nowadays, a keyboard-video-mouse (KVM) switch interconnecting between a console and a plurality of computers is widely utilized to transmit KVM signals therebetween for remotely controlling the plurality of computers from the console. An on-screen display (OSD) menu interface concept is raised for convenience of operation on controlling the plurality of remote computers. The user can directly select any one of the plurality of computers from the OSD menu graphically presented on a displayer coupled to the console. Originally, it is designed only for connecting to fewer computers due to a restricted remote control ability of the KVM switch. However, the design of the KVM switch has greatly been improved on aspects of functions. Especially, the number of computers joined to the network can be greatly increased for complying with explosive growth of various network neighborhoods. Even multiple KVM switches can be constituted in daisy chain or cascade with each other. Sometime, the number of computers joined to the multiple KVM switches in daisy chain and cascade can reach up thousands. Obviously, as shown in FIG. 2, a traditional OSD menu is entirely composed of pure texts. It will be laboriously for any user to seek one by one and then access each desired computer coupled to the KVM switch. For example, by multiple-level cascades, e.g. five levels, or even eight levels, the user has to sequentially access these levels to find out the desired computer. Without a prepared detail list relative to all the computers, it will be hardly found out the desired computer because the OSD menu composed of pure text reveals little information related to the desired computer. Furthermore, the user has to waste lots of time to manipulate such an un-humanized interface to get better skill in operation.

Several prior arts adoptive of said traditional OSD menu technology have been disclosed in U.S. Pat. Nos. 5,721,842, 5,884,096, 5,937,176, 6,112,264, 6,345,323, and U.S. Patent Application Publication No. 20020087753. Further referring to FIG. 1, an exemplar showed that an on-screen display (OSD) menu was constructed by video signals generated from an on-screen display (OSD) circuit 14, e.g. an OSD Chip. Then the video signals of the on-screen display (OSD) menu are transmitted to an overlay circuit 12. The overlay circuit 12 is able to simultaneously receive and combine the real-time video signals from a remote computer and the video signals of the OSD menu. While the user wakes the OSD menu up to select one of the computers from a monitor of the console device, an overlay signal generated by combining the real-time video signals from the selected computer with the video signals related to the OSD menu is outputted to the monitor. As a result shown in FIG. 2, a traditional OSD menu image graphed over a managing image from the selected computer is displayed on the central position of the monitor 212. The OSD circuit 12 is used for generating the video signal of the OSD menu. An overlay circuit 14 is used to combine the real-time video signal from the computer and the video signal of the OSD menu. Nevertheless, the signal processes for both the OSD circuit 14 and overlay circuit 12 are greatly complicated. That is because that the overlay circuit 12 according to a keyboard/mouse signal (OSD menu enable signal) through the KVM switch 18 to determine whether the video signal of the OSD menu or the video signal from the computer is outputted for every single pixel on the monitor.

Consequentially, there's a need to set forth a system and method for controlling remote computers having greater convenient operation and better-humanized interface.

SUMMARY OF THE INVENTION

An object of the present invention is to provide a KVM system for controlling computers and the method for the same, which is able to actively generate a menu or an image constructed by real-time video signals from at least one of the computers on a video monitor of a console.

Another object of the present invention is to provide a KVM system for controlling computers and the method for the same, which is able to preview a preview image constructed by video signals from the computers by picking up the menu image.

To accomplish the above objects, the present invention provides a KVM system for connecting a console device having a keyboard, cursor control device and video monitor to a number of computers. The KVM system comprises a user-side circuit, a central crosspoint switch, a plurality of computer-side circuits and a graphic user interface menu apparatus comprising at least a menu generating unit and a first switching device. The user-side circuit couples to the console device for receiving electronic signals produced by the keyboard and cursor control device and for creating a data packet that includes the electronic signals. The central crosspoint switch couples to the user-side circuits and includes a number of inputs and a number of outputs, the central crosspoint switch receives the data packets from one of the inputs and routes the data packets to one or more of the outputs. The plurality of computer-side circuits couple to the central crosspoint switch and the computers and receives the data packets transmitted from the central crosspoint switch for supplying the data packets to one of the computers. The menu generating unit of the graphic user interface menu apparatus generates a menu data. The first switching device outputs the menu data or a real-time video signal from one of the computers to the video monitor.

Furthermore, the graphic user interface menu apparatus comprises an image capture device deposed between the console device and the computers to capture the video signals from the computers to construct the preview images. The graphic user interface menu apparatus further comprises a processor, a memory and a video signal generator. The processor controls all devices in the graphic user interface menu apparatus. The memory is used to pre-store the preview images temporarily. The video signal generator coupled to the first switch device, generates the menu data to the video monitor.

A method for controlling a number of computers principally comprises the steps of:

generating menu data by a menu generating unit; and selectably outputting the menu data or real-time video signals from one of the computers via a first switching device to a video monitor by a first switching device, thereby displaying a menu or an image constructed by the real-time video signals on the video monitor.

Beside, the present invention further comprises the following steps of:

capturing a video signal from the computers to construct preview image data on the video monitor by an image capture device;

pre-storing the preview image data in a memory;

displaying a preview image on the video monitor according to the preview image data by manipulating the menu.

DETAILED DESCRIPTION OF THE PREFERRED EMBODIMENTS

Figure 1:
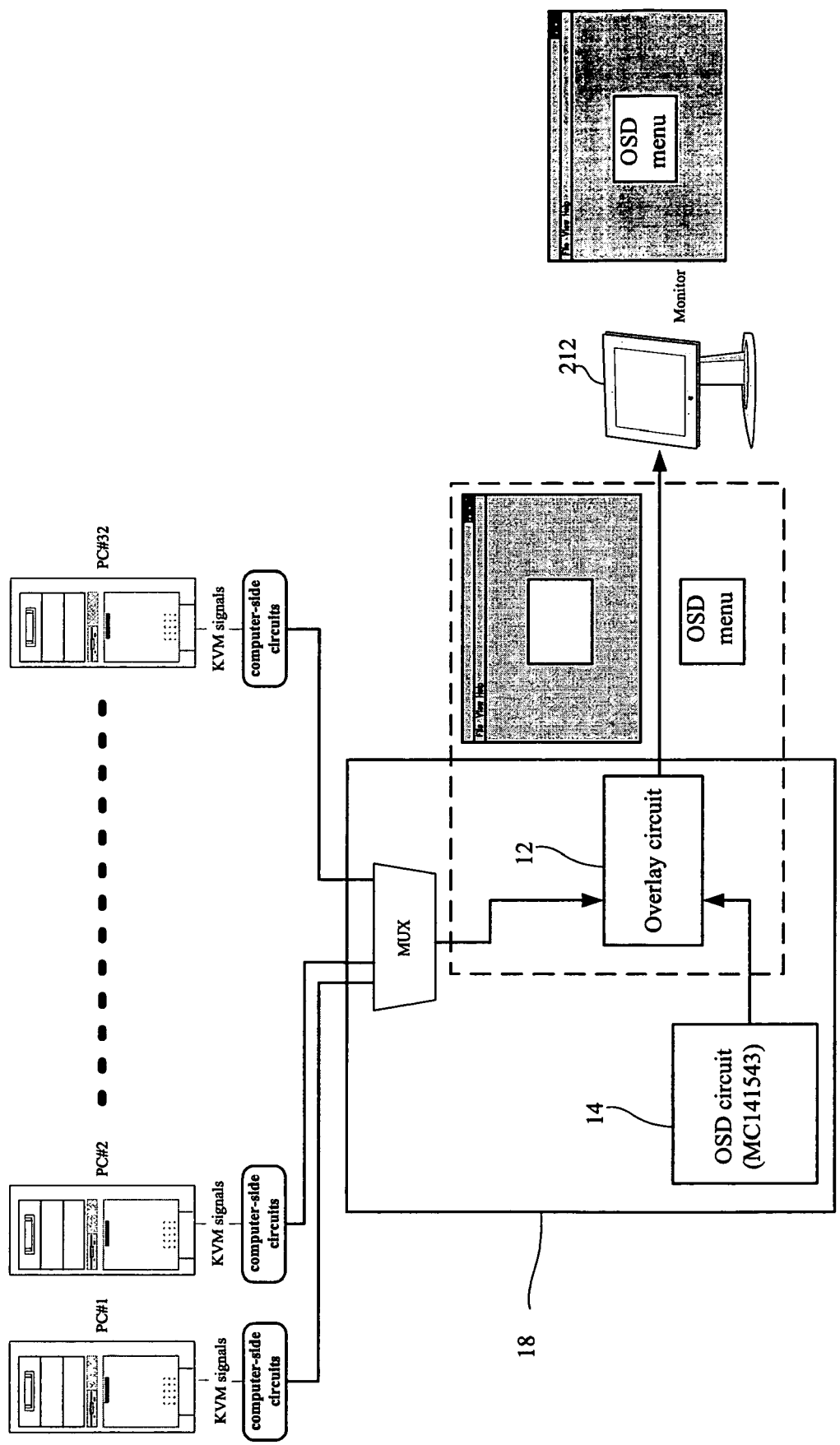
FIG. 1 illustrates a system with a traditional OSD menu on the video monitor according to the prior art.
Figure 2:
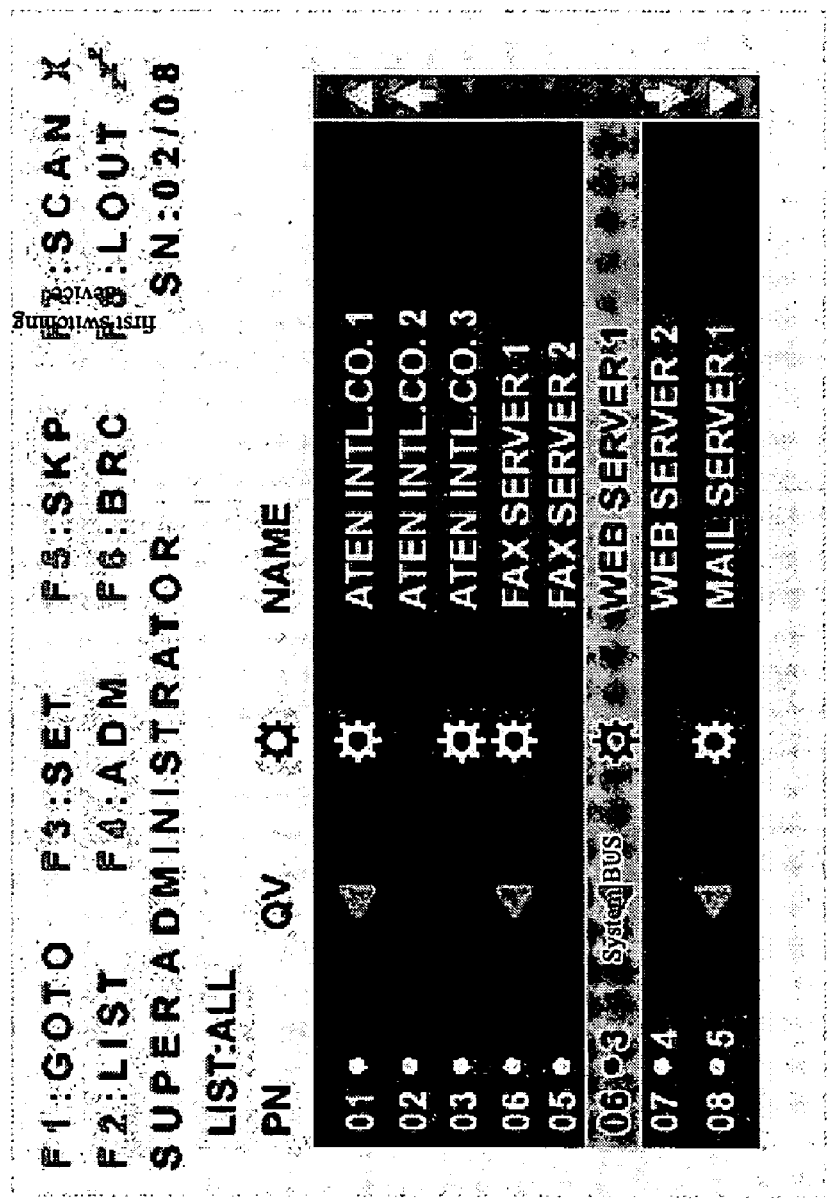
FIG. 2 illustrates a frame with traditional OSD menu composed of texts on the video monitor, according to the system of FIG. 1.
Figure 3:
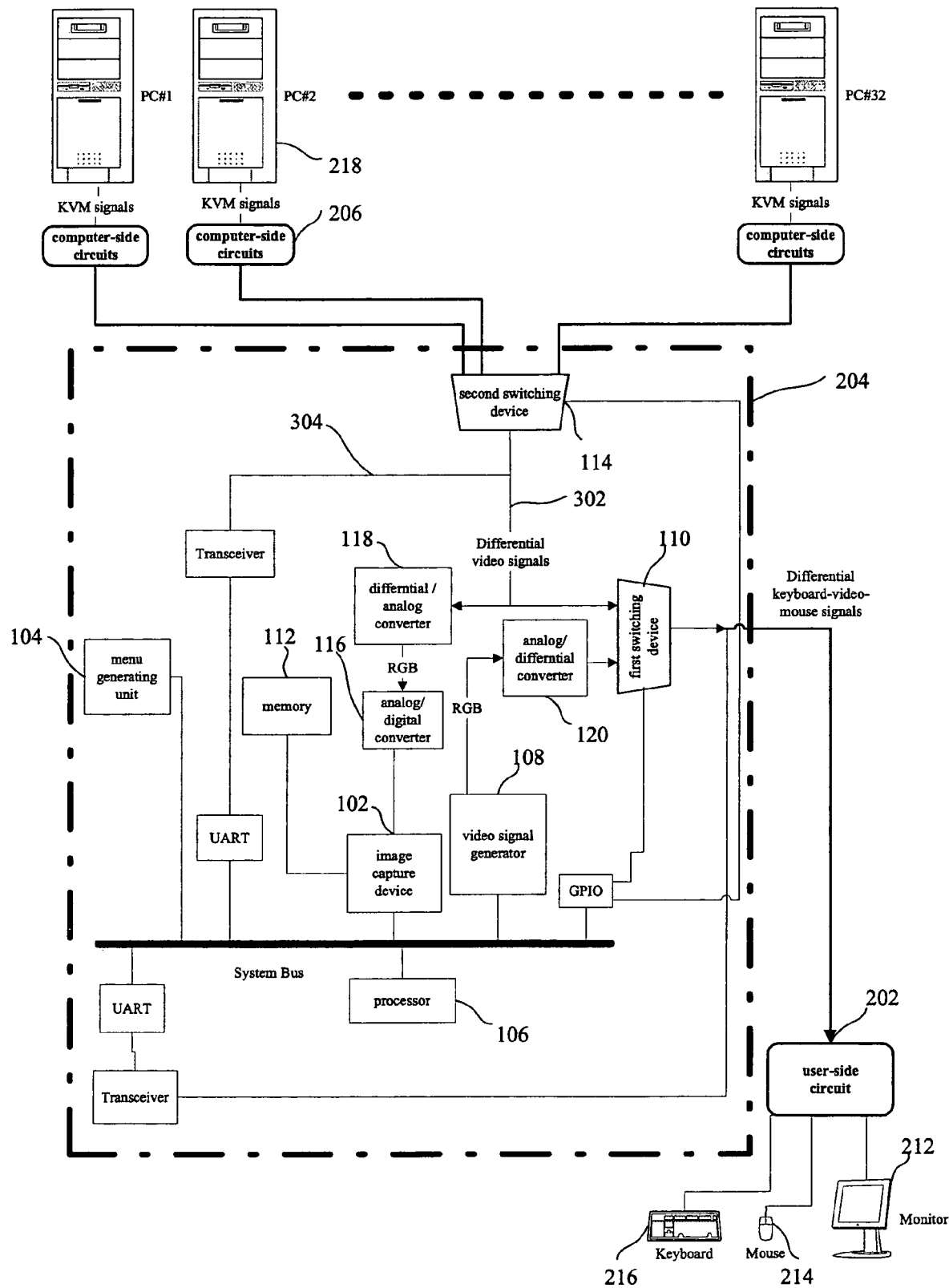
FIG. 3 illustrates a KVM system having a graphic user interface menu apparatus located in a central crosspoint switch of the KVM system connected between a console device including a keyboard, cursor control device and video monitor and a number of computers, according to a first embodiment of the present invention.

Please refer to FIG. 3, which illustrates a KVM system according to a first embodiment of the present invention, principally including a user-side circuit 202, a central crosspoint switch 204 and a plurality of computer-side circuits 206. The central crosspoint switch 204, such as a KVM switch, having a number of inputs and a number of outputs, is connected to a console device including a keyboard 216, a cursor control device 214 which can control the movement of the cursor, such as a mouse, a touch pad or a track ball, and a video monitor 212 through the user-side circuit 202, and alternatively is connected to a plurality of computers 218 (i.e. PC#1~32) through the computer-side circuits 206. In application, the central crosspoint switch 204 receives the data packets (or a differential signal, or analog signal, depending on a communication specification adaptive of the KVM switch 204) from one of the inputs and routes the data packets to one or more of the outputs thereof. The plurality of computer-side circuits 206 receives the data packets transmitted from the central crosspoint switch 204 for supplying the data packets to at least one of the computers 218. Furthermore, the KVM system employs a graphic user interface menu apparatus located in said central crosspoint switch 204. For extending a communication distance between the console device and the number of computers 218, the user-side circuit 202 and the computer-side circuit 206 are respectively adopted, additionally. The graphic user interface menu apparatus principally includes a menu generating unit 104, a first switching device 110, a image capture device 102, a processor 106, a video signal generator 108, a memory 112 and a second switching device 114. Specifically, the menu generating unit 104 can be realized by an ASIC to generate the graphic user interface menu or even just a storing device that stores a special software program for generating the graphic user interface menu to be displayed on the video monitor 212.

In contrary to the typical skill, a signal-controlling process of the KVM system according to the present invention is described below. First, the user-side circuit 202 coupled to the console device is used to receive electronic signals produced by the keyboard 216 and cursor control device 214, and create a data packet that contains the electronic signals. Part of inputs of the central crosspoint switch 204 are used for receiving the data packets from one of the console devices, and part of outputs of the central crosspoint switch 204 are used for routing the data packets from the user-side circuit 202 to one or more of the outputs. By the computer-side circuits 206, the computer 218 receives the data packets transmitted from the central crosspoint switch 204.

The menu generating unit 104 of the graphic user interface menu apparatus pre-stores menu data in the apparatus for generating a specific graphic user interface (GUI) menu image on the video monitor 212. The image capture device 102 of the graphic user interface menu apparatus is operative to capture video signals from the computer 218 to construct image files convenient to the user's preview, which are respectively pre-stored in a memory 112, temporarily. The processor 106 controls all units in the graphic user interface menu apparatus. The video signal generator 108 parses the menu data pre-stored in the menu generating unit 104 to generate the video signals that can construct a GUI menu image on the video monitor 212. The first switch device 110 realized as a multiplexer, according to the user's command, selectably outputs the menu data or the real-time video signal from the selected computer to the video monitor of the console device, as switching different viewing screen outputs. That is, once the image of the menu data is presented on the video monitor of the console, the real-time video signal from the selected computer is blocked by the first switch device 110. Therefore, the real-time video signal cannot be output to the video monitor of the console device. As a result, a menu without any background is presented on the video monitor of the console device.

In the first preferred embodiment, the graphic user interface menu apparatus further includes a second switching device 114, which is located in central crosspoint switch 204 for selectably outputting the real-time video signals from the computer 218 or other computers to the first switching device 110. The second switching device 114 can be a multiplexer or a demultiplexer.

The communication line 302 is for transmitting video signals and the communication line 304 is for transmitting keyboard, cursor control device signals. Furthermore, for a differential data type, the graphic user interface menu apparatus further includes an analog-to-digital converter 116, a differential-to-analog converter 118 and an analog-to-differential converter 120. The differential-to-analog converter 118 transforms the differential video signals into analog video signals. The analog-to-digital converter 116 transforms the video signals into video data, which is consumed by the image capture device 102 to construct the preview image. The analog-to-differential converter 120 coupled to the video signal generator 108 transforms the analog video signals into the differential video signals used for the first switching device 110.

Besides, the transceiver, UART and GPIO shown in figures are mostly related with processing keyboard, cursor control device signals.

Figure 4:
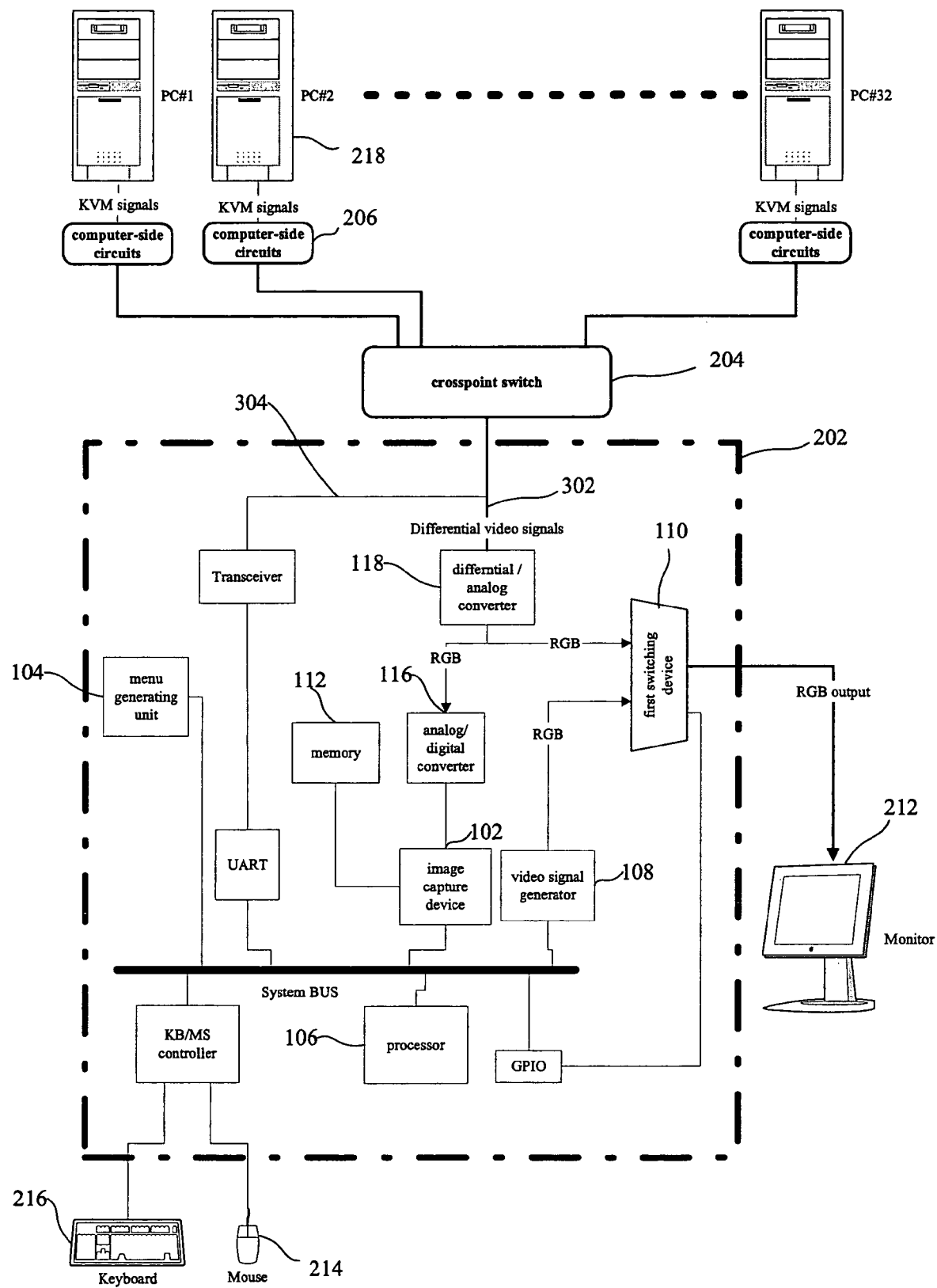
FIG. 4 illustrates a KVM system having a graphic user interface menu apparatus located in a user-side circuit of the KVM system connected between a console device and a number of computers, according to a second embodiment of the present invention.

Please refer to FIG. 4. It illustrates a KVM system having a graphic user interface menu apparatus located in a user-side circuit, according to a second embodiment of the present invention. In this second embodiment, the graphic user interface apparatus merely receives the video signals from the central crosspoint switch 204 without need of selecting the computer 218. Meanwhile, the video signals (i.e. RGB signals for the video monitor 212 shown in FIG. 4) are generated by the video signal generator 108 and are then transmitted through the first switching device 110 to the video monitor 212 of the console device for user's view.

As aforementioned, the transceiver, UART and GPIO additional keyboard, cursor control device controller (KB/MS controller) shown in figures are mostly related with processing keyboard, cursor control device signals.

Figure 5:
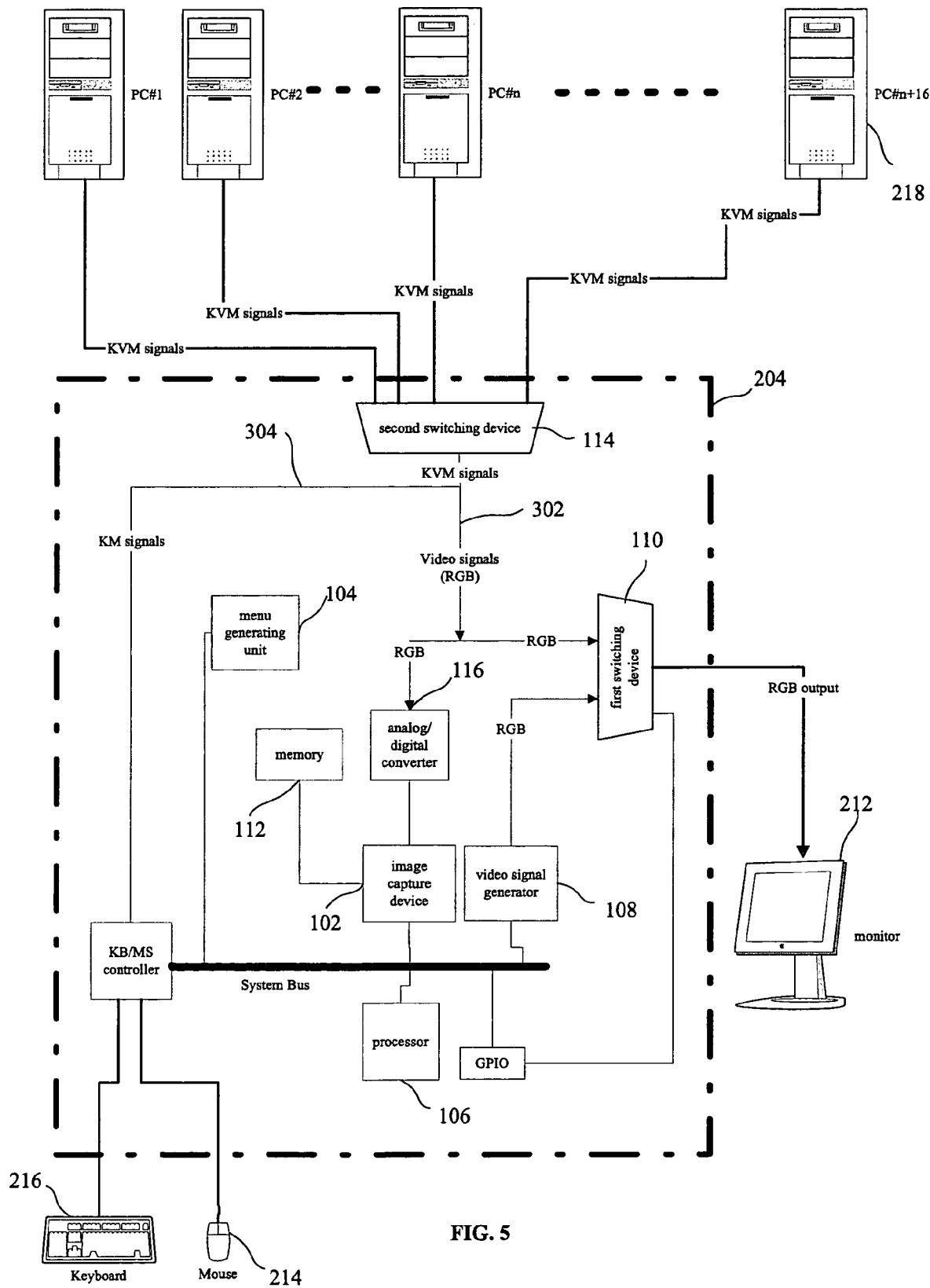
FIG. 5 illustrates a KVM system having a graphic user interface menu apparatus located in a central crosspoint switch of the KVM system that the KVM signals transmitted between a console device and a number of computers according to a third embodiment of the present invention.

Please refer to FIG. 5. It illustrates a KVM system having a graphic user interface menu apparatus located in a central crosspoint switch 204, according to the third embodiment of the present invention. The KVM signal is transmitted through the system in the form of analog. Therefore, in this third embodiment with usage of analog keyboard, video, cursor control device data, an analog-to-digital converter is employed to transform the analog video signals into data packets for processor 106 and other related component.

Figure 6:
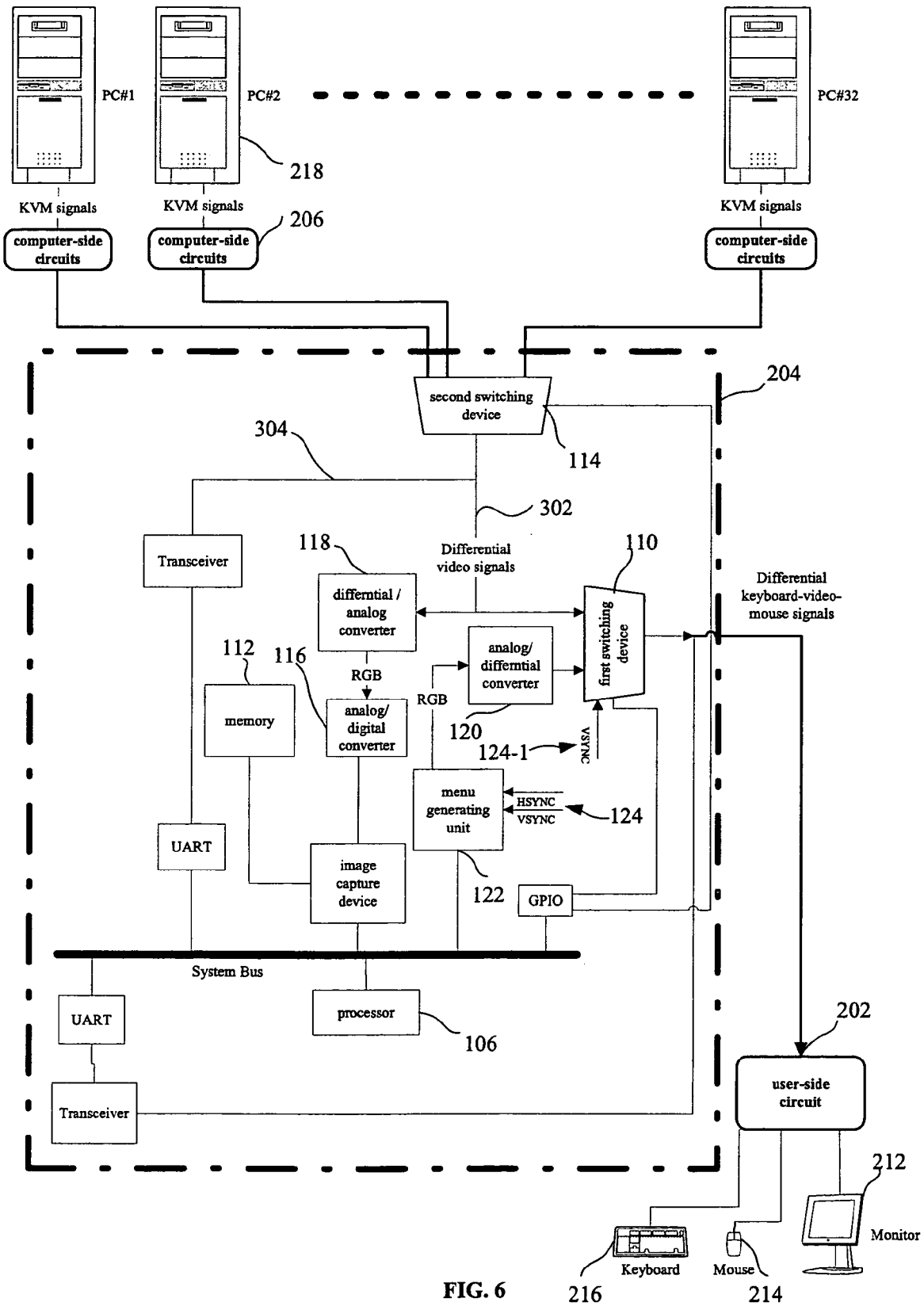
FIG. 6 illustrates a KVM system having a graphic user interface menu apparatus further comprising a synchronization signal source for the menu generating unit according to a fourth embodiment of the present invention.

Please refer to FIG. 6. It illustrates a system having a graphic user interface menu apparatus according to a fourth embodiment of the present invention, which includes a synchronization signal source for the menu generating unit 122. The menu generating unit 104 mentioned in FIG. 3 can be implemented in a form of software. However, the menu generating unit 122 shown in FIG. 6 with a synchronization signal source 124 is implemented in a form of hardware. The present invention provides the synchronization signal source 124 for the menu generating unit 122 to generate an OSD menu. For example, the IC production named "MTV021" manufactured by Myson Technology. However, the OSD menu only shows up alone in the video monitor 212 of the console device as same as the previous three embodiments. That is, there is no image from the computer existing in the background of the OSD menu. The first switching device 110 outputs either the menu data or the real-time video signals from one of the computers to the video monitor. The menu generating unit 122 generates a graphic user interface menu like the first to third embodiment.

Figure 7:
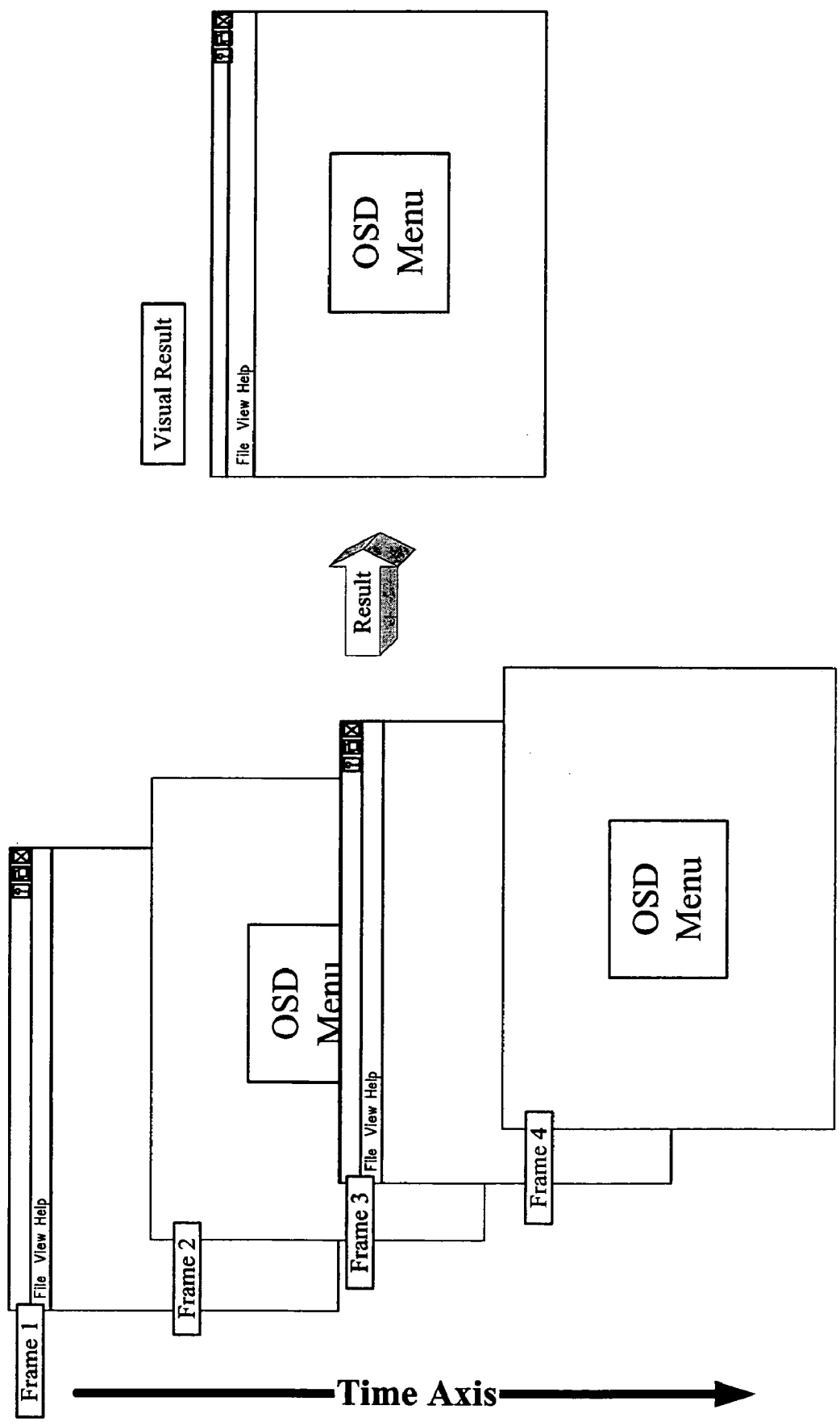
FIG. 7 illustrates a result of alternately switching two frames constructed by the real-time image of the computer and the image of the OSD menu according to an embodiment of the present invention.

Please refer to FIG. 7. Alternatively, to avoid monotone and supply more information, when the user watches the monitor, the present invention still can display the real-time video signals of the computer for the user. Please refer to FIG. 6 with FIG. 7. It shows that a vertical synchronization signal (VSYNC) 124-1 is provided to the first switching device 110 to control the outputting of the first switching device 110. The vertical synchronization signal 124-1 can come from the same source as synchronization signal 124 (VSYNC) or a different source from the synchronization signal 124. Originally, the synchronization signal's 124 source is from the computer 218 or other computer. The purpose of the synchronization signal (horizontal and vertical synchronization signal) is to synchronize the video signals (red, green, blue colors) of the OSD menu when outputted to the monitor. Here, the vertical synchronization signal 124-1 is employed as a toggle signal to control the outputting of the first switching device 110. Generally, both the vertical synchronization signal 124 and 124-1 are from the same source of the computer.

Meanwhile, the added vertical synchronization signal 124-1 is employed to determine whether the real-time video signals from the computer or the video signals of the OSD menu will be outputted to the monitor. Therefore, the GUI apparatus can use vertical synchronization signal 124-1 to control the first switching unit 110 alternately outputting the menu data and the real-time video signals from the computer to the video monitor 212. The first switching unit 110 outputs the video signals of the order: frame 1-frame 2-frame 3-frame 4 alternately as shown in FIG. 7. The odd frames, such as Frames 1 and 3 images, are constructed by the video signals from the computer, the even frames, such as Frames 2 and 4 images, are constructed by the video signals from the OSD menu generating unit. For example, at first, the first switching device 110 outputs the Frame 1. Thereafter, once the first switching device 110 receives the vertical synchronization signal 124-1, the first switching device 110 alters to output the Frame 2 constructed by the video signals from the OSD menu generating unit. After that, once the first switching device 110 receives the vertical synchronization signal 124-1 again, the first switching device 110 alters to output the Frame 3 constructed by the video signals from the computer. By high speed switching between the above two video signals alternately, resulting in video monitor 212 presents the real-time image of the computer and the image of the OSD menu just like an animation consisting of repeating films (as the visual effect shown in the right part of FIG. 7.). Generally speaking, according to the VESA standard, the frequency of the vertical synchronization signal 124-1 can be 60 Hz, 75 Hz or even higher.

When the user uses a keystroke or a sequence of keystrokes of the keyboard to activate a GUI menu, the menu generating unit 122 according to the keystroke generates a menu data. Then a graphic user interface menu constructed by the menu data is shown on the video monitor, as presented in FIG. 7. In the device management explorer area 502, a plurality of icons representing the devices are shown in a tree schema. The user can easily understand the real connection of all devices fully at a glance, even through a real connection in cascade, e.g. five levels, or even eight levels. Unlike the prior art, a text-only OSD menu revealing little information may easily confuse the user. In the stage of the preview area 504, a preview image from the selected computer will show up on user's demand. In the embodiment, the preview area 504 is blank when the graphic user interface menu is activated initially.

Figure 8:
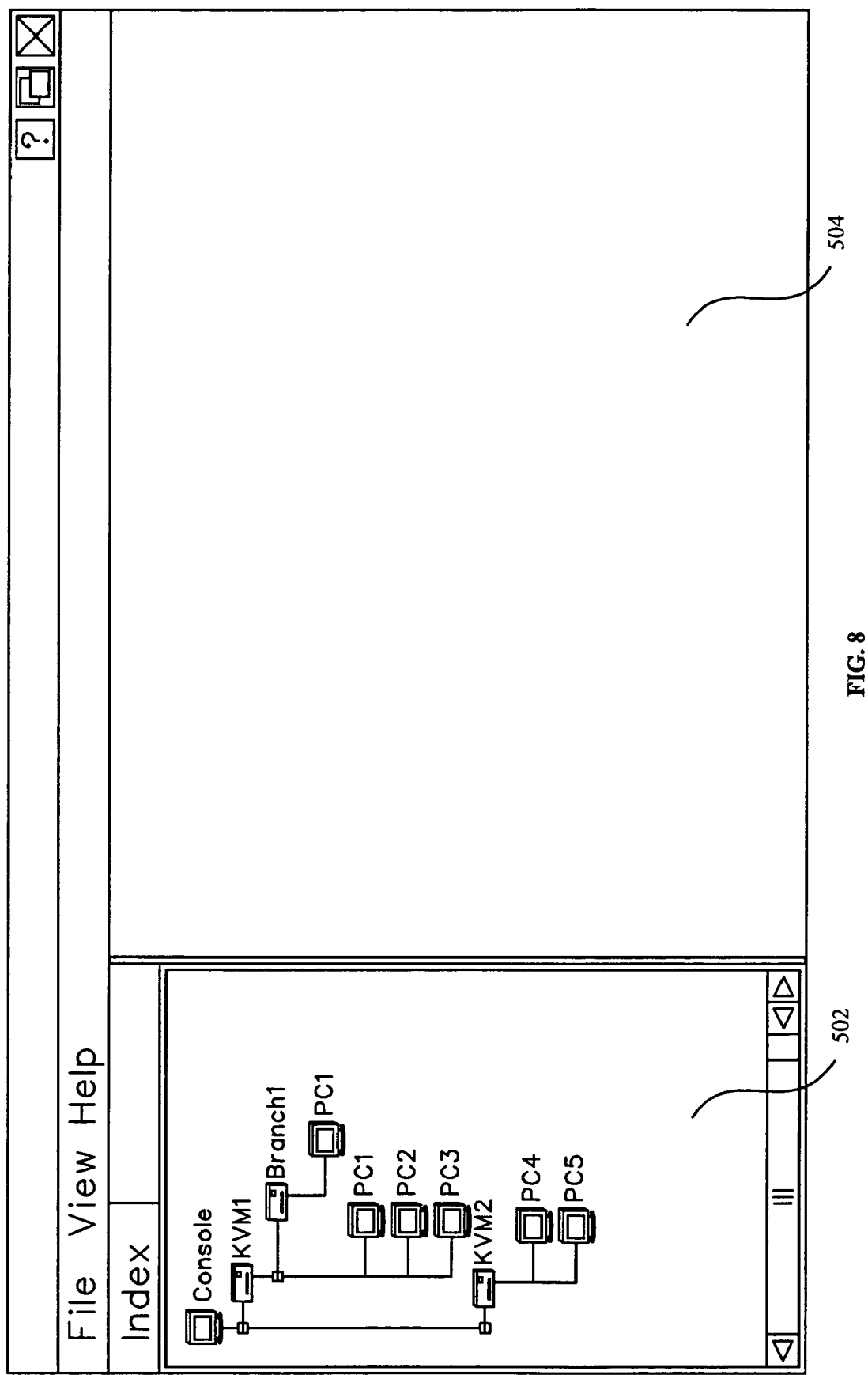
FIG. 8 illustrates a frame, which shows a graphic user interface menu initially activated after a keystroke command of the keyboard.

Please refer to FIG. 8. The frame shows that a graphic user interface menu image arranged side by side with four preview images from four of the computers. After the graphic user interface menu is activated as shown in FIG. 7. The user can select the KVMs (central crosspoint switch'indicators) or the PC (computer's indicators) in the device management explorer area 502. For example, the user selects the KVM1, then each preview images of the PC1, PC2, PC3 and PC4 pops up in quarter of the preview area 504 correspondingly. The preview images 504-1, 504-2, 504-3 and 504-4 are corresponding to the computers PC1, PC2, PC3 and PC4. Specifically, the preview images of the computers are captured by the image capture device and pre-stored in the memory in a form of static picture. The timing of capturing video signals from the computers to construct preview images by an image capture device 102 can be settle down in a predetermined interval regularly, e.g. 1 second or 250 seconds or after the user has selected the specific KVM or PC in the graphic user interface menu. The image capture device captures the preview images from the video output port of the computers through the communication line 302, which is specifically for transmitting video signals, e.g. VGA port.

Figure 9:
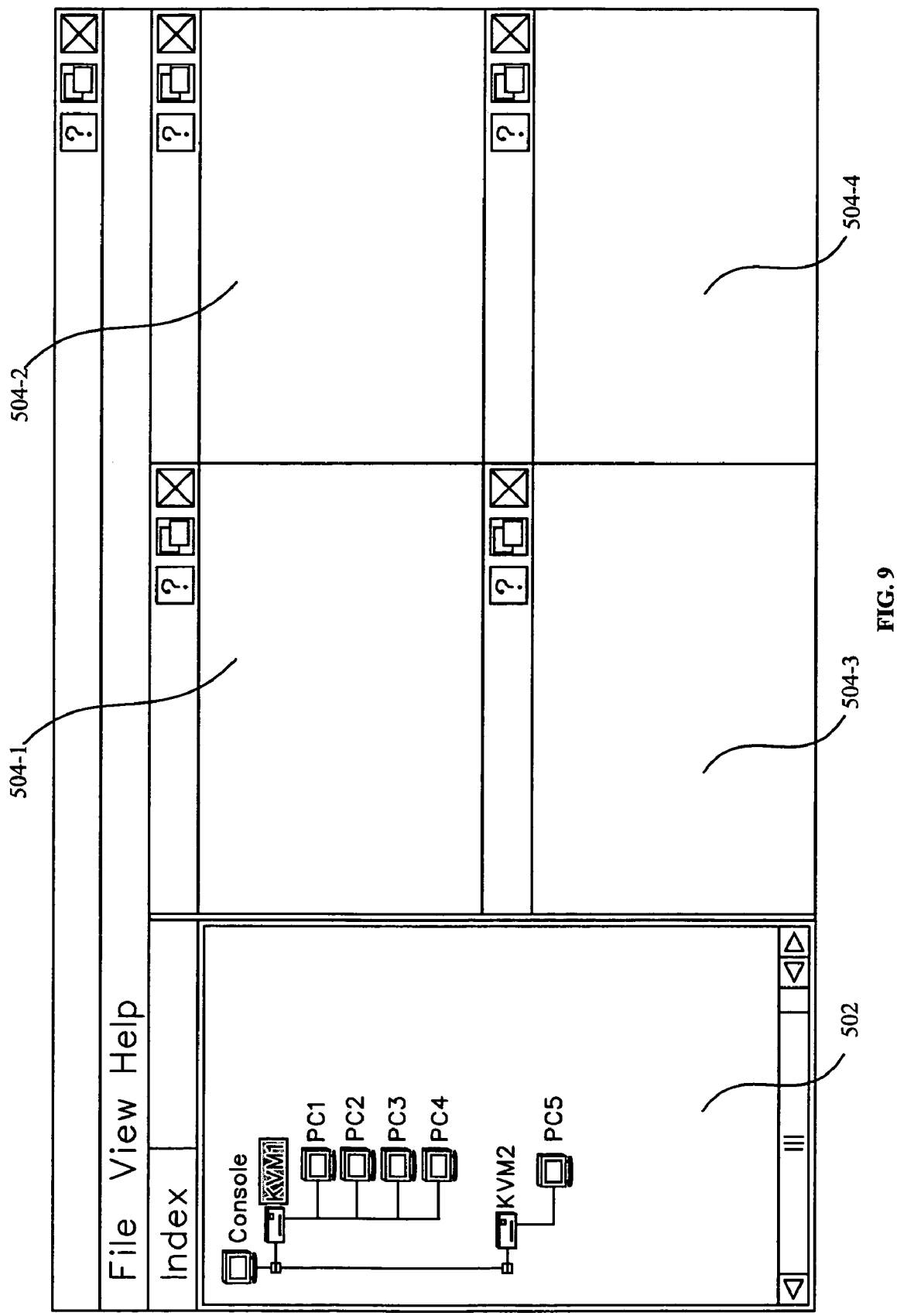
FIG. 9 illustrates a frame that shows a graphic user interface menu image arranged side by side with four preview images relative to four different computers.
Figure 10:
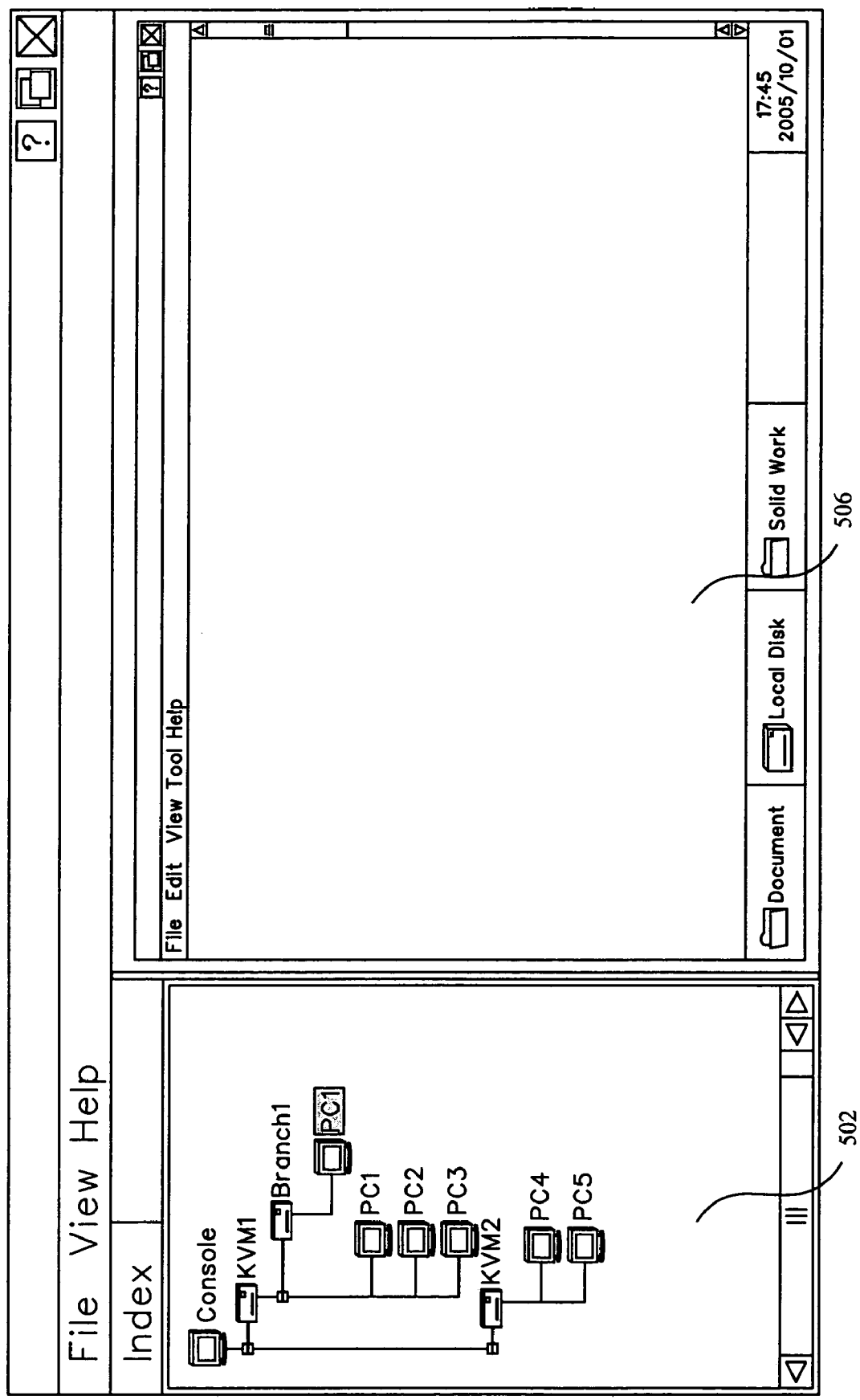
FIG. 10 illustrates a frame that shows a graphic user interface menu image arranged side by side with a specific preview image from a single selected computer.
Figure 11:
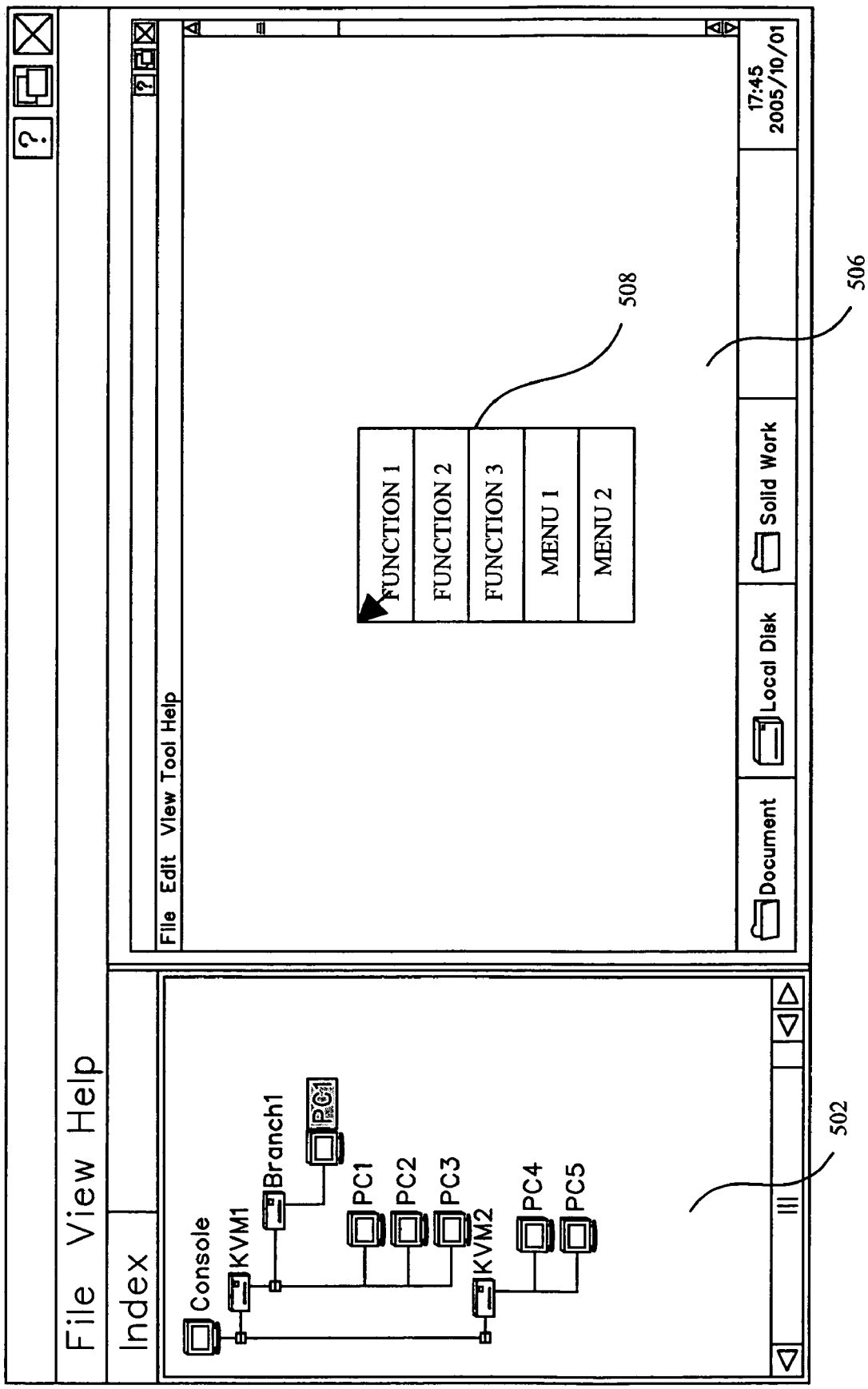
FIG. 11 illustrates a frame that a viewing screen relative to either the console device or the selected computer is being switched by a scrolling-down submenu in the graphic user interface menu.

Please refer to FIG. 9. To follow the FIG. 7 and FIG. 8, the frame that a graphic user interface menu image arranged side by side with specific the preview image of the selected computer with the menu image. For instance, the user also can explore the tree schema shown in the device management explorer area 502 and select the desired computer (PC1). The preview image 506 of the PC1 pops up as shown. Furthermore, please refer to FIG. 10. The frame shows that the user is given more power to switch the viewing screen at the console device or control the selected computer, through a pull-down submenu in the graphic user interface menu. Following user's operation mentioned in FIG. 9, a pull-down submenu 508 shown in the preview image 506 providing more functions designed in advance. For instance, the user can switch viewing screen from the menu image to the real-time video signals from the selected computer by selecting the FUNCTION 1 in the pull-down submenu 508, i.e. controlling the outputting source of the first switching device 110.

Please refer to FIG. 3 and FIG. 9. In these cases, the user commands the menu generating unit 104 to generate a corresponding menu data by a keystroke or a sequence of keystrokes (by the cursor control device 214 or the keyboard 216). Then the first switch device 110 outputs menu data to the video monitor 212 of the console for displaying the menu on the video monitor 212. When the user selects one of specific icons relative to computers in the device management explorer area 502 of the menu, a preview image 506 corresponding to the computer is showed in the stage of the preview area 504. Therefore, the user can actively know the status of the selected device. Thus, the user can control the first switch device 110 to selectably output the menu data or the real-time video signals from the selected computer on demands.

In conclusion, the proposed invention is able to provide a system and method for controlling computers, which is able to actively output a menu or an image constructed by real-time video signal from at least one of the computers on a video monitor of a console. The graphic user interface apparatus captures the video signals from the computers to construct preview images of the computers to be employed in the graphic user interface menu for user's preview.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A system for connecting a console device including a keyboard, cursor control device and video monitor to a number of computers, the system comprising:
   a user-side circuit coupled to the console device for receiving electronic signals produced by the keyboard and cursor control device and for creating a data packet that includes the electronic signals;
   a central crosspoint switch, coupled to the user-side circuits, including a number of inputs and a number of outputs, the central crosspoint switch receiving the data packets from one of the inputs and routing the data packets to one or more of the outputs;
   a plurality of computer-side circuits coupled to the central crosspoint switch and the computers, for receiving the data packets transmitted from the central crosspoint switch and for supplying the data packets to one of the computers;
   a menu generating unit for generating menu data;
   a video signal generator for generating a first analog video signal from the menu data;
   an analog-to-differential converter coupled to the video signal generator for transforming the first analog video signal into a differential video signal representing the menu data;
   a first switching device, for selectively outputting the differential video signal representing the menu data or a real-time video signal from one of the computers to the video monitor;
   an analog-to-digital convener to transform a second analog video signal into video data; and
   a differential-to-analog converter to transform the real-time video signal into the second analog video signal.

2. The system according to claim 1, further comprises an image capture device, deposited between the console device and the number of computers, for capturing a video signal from at least one of the computers to construct at least one preview image.

3. The system according to claim 2, wherein the image capture device is located in the user-side circuit.

4. The system according to claim 2, wherein the image capture device is located in the central crosspoint switch.

5. The system according to claim 1, further comprising a second switching device, for selecting one of the computers to output the real-time video signal from the one of the computer to the first switching device.

6. The system according to claim 1, wherein the menu generating unit generates an OSD menu.

7. The system according to claim 6, further comprising a synchronization signal source for the menu generating unit.

8. The system according to claim 6, further comprising a vertical synchronization signal source for generating a synchronization signal for the first switching device.

9. The system according to claim 8, wherein the first switching device alternately outputs the menu data and the real-time video signals from one of the computers to the video monitor according to the synchronization signal.

10. A graphic user interface menu apparatus applied in a connection between a console device including a keyboard, cursor control device and video monitor and a number of computers, the apparatus comprising:
    a menu generating unit for generating menu data;
    a video signal generator for generating a first analog video signal from the menu data;

an analog-to-differential converter coupled to the video signal generator for transforming the first analog video signal into a differential video signal representing the menu data; and a first switching device, for selectively outputting the differential video signal representing the menu data or a real-time video signal from one of the computers to the video monitor; and a differential-to-analog converter to transform the real-time video signal into a second analog video signal.

11. The apparatus according to claim 10, further comprising an image capture device, disposed between the console device and the computers, for capturing a video signal from at least one of the computers to construct at least one preview image.

12. The apparatus according to claim 10, further comprising a second switching device, for selecting one of the computers to output the video signal from the one of the computer to the first switching device.

13. The apparatus according to claim 10, further comprising an analog-to-digital converter to transform the video signal into video data.

14. The apparatus according to claim 10, wherein the menu generating unit generates an OSD menu.

15. The apparatus according to claim 10, further comprising a synchronization signal source for the menu generating unit to generate the menu data.

16. The apparatus according to claim 10, further comprising a vertical synchronization signal source for generating a vertical synchronization signal for the first switching device.

17. The apparatus according to claim 16, wherein the first switching unit alternately outputs the menu data and the real-time video signals from one of the computers to the video monitor according to the vertical synchronization signal.

18. A method for controlling a number of computers in a connection from a console device including a keyboard, cursor control device and video monitor, wherein the method comprising the steps of:

generating menu data by a menu generating unit;

generating a first analog video signal from the menu data;

transforming the first analog video signal into a differential video signal representing the menu data; and outputting the differential video signal representing the menu data or a real-time video signal from one of the computers to the video monitor according to a vertical synchronization signal;

transforming a second analog video signal into video data after a step of selecting one of the computers to output the video signal by an analog-to-digital converter; and transforming the real-time video signal into the second analog video signal before the step of transforming the second analog video signal into the video data by a differential-to-analog converter.

19. The method according to claim 18, further comprising a step of capturing a video signal from at least one of the computers to construct at least one preview image by an image capture device before the step of generating the menu data.

20. The method according to claim 18, further comprising a step of capturing a video signal from at least one of the computers to construct at least one preview image, combining the preview image with a menu image after the step of outputting the menu data.

* * * * *